United States Patent
Nishiyama (10) Patent No.: US 10,872,462 B2
(45) Date of Patent: Dec. 22, 2020

(54) IMAGE PROCESSING APPARATUS, METHOD, AND NON-TRANSITORY COMPUTER-READABLE MEDIUM FOR RENDERING A VIRTUAL VIEWPOINT IMAGE

(71) Applicant: CANON KABUSHIKI KAISHA, Tokyo (JP)

(72) Inventor: Tomohiro Nishiyama, Tama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/056,898

(22) Filed: Aug. 7, 2018

(65) Prior Publication Data
US 2019/0051035 A1 Feb. 14, 2019

(30) Foreign Application Priority Data

Aug. 10, 2017 (JP) .................. 2017-155882

(51) Int. Cl.
*G06T 15/20* (2011.01)
*G06T 7/73* (2017.01)
(Continued)

(52) U.S. Cl.
CPC .............. *G06T 15/205* (2013.01); *G06T 3/40* (2013.01); *G06T 7/73* (2017.01); *H04N 13/117* (2018.05);
(Continued)

(58) Field of Classification Search
CPC .................................................. G06T 15/205
See application file for complete search history.

(56) References Cited

U.S. PATENT DOCUMENTS

2002/0180734 A1* 12/2002 Endoh ................. G06F 3/04815
345/428
2007/0168413 A1* 7/2007 Barletta .............. G06F 3/04883
709/203
(Continued)

FOREIGN PATENT DOCUMENTS

JP 2000215311 A 8/2000
JP 2002366935 A 12/2002
(Continued)

OTHER PUBLICATIONS

Extended European Search Report for application No. 18185722.8 dated Dec. 10, 2018 (8 pages).
(Continued)

*Primary Examiner* — Terrell M Robinson
(74) *Attorney, Agent, or Firm* — Carter, DeLuca & Farrell LLP (57) ABSTRACT

There is provided with an image processing apparatus. An image obtaining unit obtains images acquired based on image capturing for a target area from a plurality of directions by a plurality of cameras. An information obtaining unit obtains viewpoint information indicating a position of a virtual viewpoint. A setting unit sets, based on a reference position within the target area and the viewpoint information obtained by the information obtaining unit, a parameter relating to a resolution of an object within the target area. A generating unit generates, based on the images obtained by the image obtaining unit and the viewpoint information obtained by the information obtaining unit, a virtual viewpoint image that includes an image of the object with the resolution according to the parameter set by the setting unit.

15 Claims, 7 Drawing Sheets

(51) Int. Cl.
*G06T 3/40* (2006.01)
*H04N 13/243* (2018.01)
*H04N 13/122* (2018.01)
*H04N 13/117* (2018.01)

(52) U.S. Cl.
CPC ......... *H04N 13/122* (2018.05); *H04N 13/243* (2018.05); *G06T 2207/30244* (2013.01)

(56) References Cited

U.S. PATENT DOCUMENTS

| | | | |
|---|---|---|---|
| 2011/0054857 A1 | 3/2011 | Moguchaya | |
| 2011/0129165 A1* | 6/2011 | Lim | G02B 27/0075 |
| | | | 382/255 |
| 2011/0142321 A1* | 6/2011 | Huffman | G06F 19/321 |
| | | | 382/131 |
| 2011/0254958 A1* | 10/2011 | Kotani | G06T 15/205 |
| | | | 348/159 |
| 2012/0056903 A1* | 3/2012 | Shinohara | G06F 3/013 |
| | | | 345/676 |
| 2015/0221126 A1* | 8/2015 | Liu | G06T 15/20 |
| | | | 382/276 |
| 2016/0140733 A1* | 5/2016 | Gu | H04N 5/247 |
| | | | 348/43 |
| 2017/0111582 A1* | 4/2017 | Hu | G06T 3/4038 |
| 2017/0230633 A1* | 8/2017 | Doh | H04N 13/361 |
| 2018/0182114 A1* | 6/2018 | Hanamoto | H04N 5/2224 |
| 2018/0332218 A1* | 11/2018 | Yoshimura | H04N 5/23232 |
| 2019/0051045 A1 | 2/2019 | Nishiyama | |
| 2019/0206115 A1* | 7/2019 | Tytgat | G06F 3/012 |
| 2019/0253639 A1* | 8/2019 | Takama | G06T 15/20 |

FOREIGN PATENT DOCUMENTS

| | | |
|---|---|---|
| WO | 2010023580 A1 | 3/2010 |
| WO | 2017048104 A1 | 3/2017 |

OTHER PUBLICATIONS

Guannan Li et al: "Free-viewpoint video relighting from multi-view sequence under general illumination", Machine Vision and Applications, Springer Verlag, DE, vol. 25, No. 7, Nov. 15, 2013 (Nov. 15, 2013), pp. 1737-1746, XP035393375.

* cited by examiner

IMAGE PROCESSING APPARATUS, METHOD, AND NON-TRANSITORY COMPUTER-READABLE MEDIUM FOR RENDERING A VIRTUAL VIEWPOINT IMAGE

BACKGROUND OF THE INVENTION

Field of the Invention

The present invention relates to an image processing apparatus, a method, and a non-transitory computer-readable medium.

Description of the Related Art

A method is known in which an image (a virtual viewpoint image) from a virtual viewpoint different from a captured viewpoint is generated by using images obtained by a plurality of cameras and a three-dimensional model (including information of a distance to the object) of an object. In Japanese Patent Laid-Open No. 2000-215311, it is described that, by using a distance map (data in which distance to a scene is stored in each pixel) from a perspective of a virtual viewpoint, a virtual viewpoint image is generated by calculating a pixel value for each pixel of the virtual viewpoint image.

Meanwhile, in Japanese Patent Laid-Open No. 2002-366935, it is described that, since it is necessary to have a large memory capacity for storage of three-dimensional models, a voxel resolution near the surface of an object is increased and a voxel resolution within the object is decreased.

SUMMARY OF THE INVENTION

According to an embodiment of the present invention, an image processing apparatus comprises: an image obtaining unit configured to obtain images acquired based on image capturing for a target area from a plurality of directions by a plurality of cameras; an information obtaining unit configured to obtain viewpoint information indicating a position of a virtual viewpoint; a setting unit configured to set, based on a reference position within the target area and the viewpoint information obtained by the information obtaining unit, a parameter relating to a resolution of an object within the target area; and a generating unit configured to generate, based on the images obtained by the image obtaining unit and the viewpoint information obtained by the information obtaining unit, a virtual viewpoint image that includes an image of the object with the resolution according to the parameter set by the setting unit.

According to another embodiment of the present invention, a method comprises: obtaining images acquired based on image capturing for a target area from a plurality of directions by a plurality of cameras; obtaining viewpoint information indicating a position of a virtual viewpoint; setting, based on a reference position within the target area and the obtained viewpoint information, a parameter relating to a resolution of an object within the target area; and generating, based on the obtained images and the obtained viewpoint information, a virtual viewpoint image that includes an image of the object with the resolution according to the set parameter.

According to still another embodiment of the present invention, a non-transitory computer-readable medium stores a computer program comprising instructions which, when the program is executed by a computer, cause the computer to perform: obtaining images acquired based on image capturing for a target area from a plurality of directions by a plurality of cameras; obtaining viewpoint information indicating a position of a virtual viewpoint; setting, based on a reference position within the target area and the obtained viewpoint information, a parameter relating to a resolution of an object within the target area; and generating, based on the obtained images and the obtained viewpoint information, a virtual viewpoint image that includes an image of the object with the resolution according to the set parameter.

Further features of the present invention will become apparent from the following description of exemplary embodiments with reference to the attached drawings.

DESCRIPTION OF THE EMBODIMENTS

Image quality of a virtual viewpoint image may decrease depending on a scene in a case where the method described in Japanese Patent Laid-Open No. 2000-215311 is used. Although the image quality of the virtual viewpoint image is improved by increasing the resolution of the three-dimensional model, this leads to an increase in the amount of processing and memory capacity necessary for processing. Even in cases where the method recited in Japanese Patent Laid-Open No. 2002-366935 is used, reduction of the amount of processing and the memory capacity necessary for the processing is insufficient since it is necessary to sufficiently reduce the voxels indicating the surface shape of an object whose influence on the quality of the virtual viewpoint image is large.

One embodiment of the present invention makes it possible to reduce processing load while maintaining an acceptable quality when generating a virtual viewpoint image.

In the case of generating a virtual viewpoint image, although the quality of the virtual viewpoint degrades when a distance resolution of object shape data is too low, the amount of processing increases in spite of the fact that the quality does not improve when the distance resolution is too high. Accordingly, in the embodiment of the present invention, a spatial resolution of object shape data to be used is adjusted so as to have a distance resolution suitable for the virtual viewpoint image to be generated. Hereinafter, embodiments of the present invention are described based on the drawings. However, the scope of the present invention is not limited to the following embodiments.

First Embodiment

In the first embodiment, description is given regarding an example in which a spatial resolution of object shape data is set in accordance with a distance from a virtual viewpoint to an object. By virtue of the embodiment, it is possible to reduce a calculation amount or the memory capacity that is used, while maintaining an acceptable quality when generating a virtual viewpoint image based on object shape data. Note, the virtual viewpoint image from a virtual viewpoint set freely is also called a free view-point image. Also, it is possible to generate the virtual viewpoint image based on a three-dimensional model of the object and hereinafter, description is given regarding a case in which the three-dimensional model of the object is used as an example of object shape data indicating the shape of the object.

Figure 1:
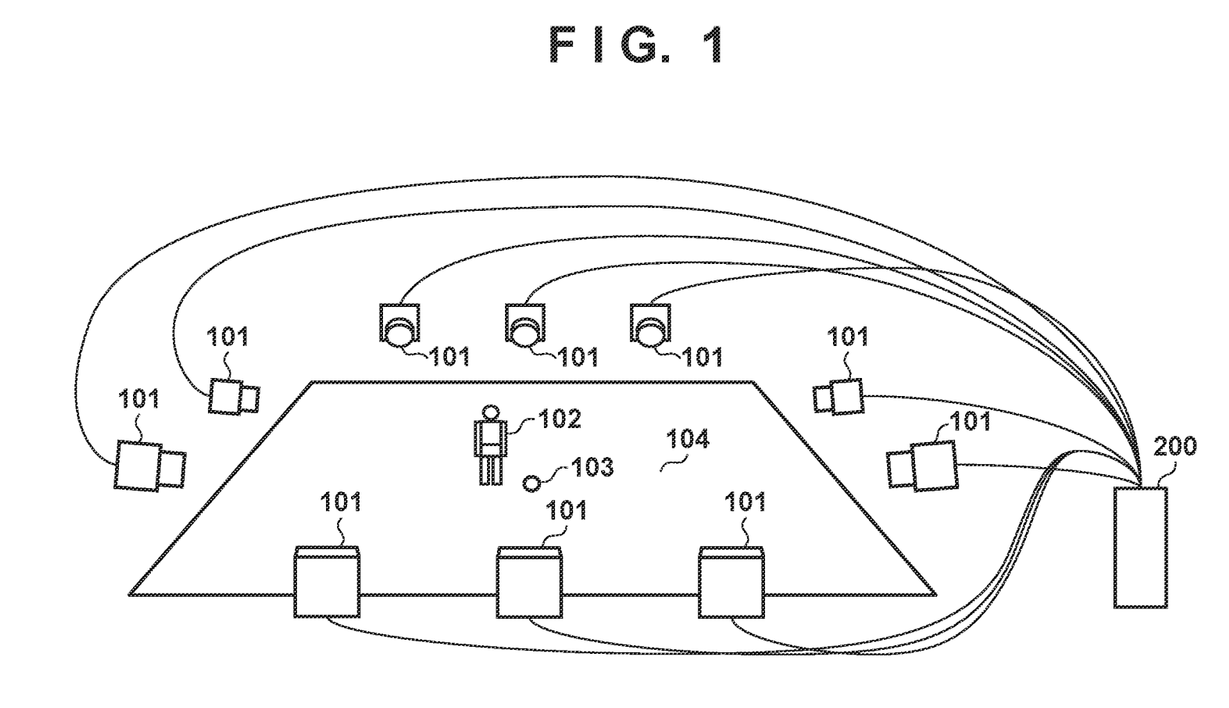
FIG. 1 is a view illustrating an example of an imaging system according to an embodiment.

FIG. 1 illustrates an example of an imaging system according to the present embodiment. An imaging system 100 is equipped with a plurality of cameras 101 and an image generation apparatus 200. In FIG. 1, an arrangement of the cameras 101 used in the present embodiment is illustrated. As illustrated in FIG. 1, capturing of the object is performed by using the plurality of the cameras 101 arranged such that the object is surrounded. The cameras 101 capture an image group of the object from a plurality of differing positions. In the example of FIG. 1, by using the plurality of the cameras 101 which are arranged inside or outside a stadium, a player 102 and a ball 103 on a ground 104, which is an imaging target area (shooting area), are captured. Although FIG. 1 illustrates an example of application to a sports scene, the present embodiment can be applied to capturing an object in any scene. Note, in the present embodiment, the object indicates a physical object moving with time and includes the player 102 and the ball 103, for example. However, the method of specifying an object is arbitrary and a still object such as a background can also be treated as an object.

Figure 2:
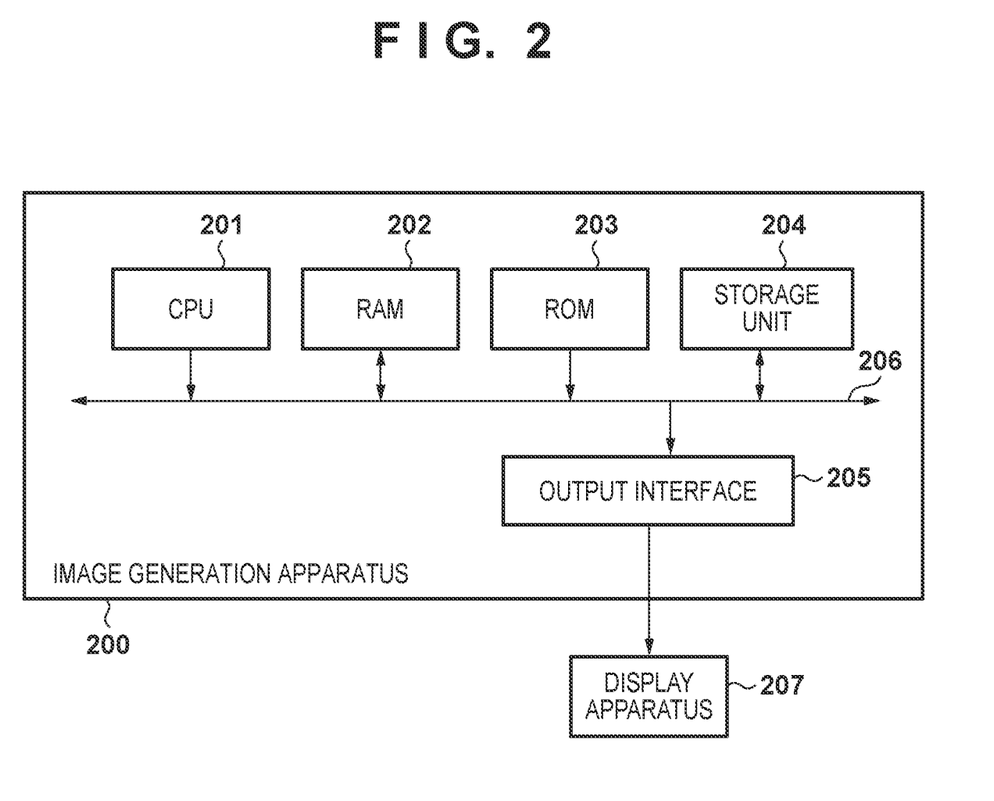
FIG. 2 is a block diagram illustrating a configuration of an image generation apparatus according to the embodiment.

Next, description is given regarding a configuration of the image generation apparatus 200 according to the first embodiment. FIG. 2 illustrates one example of a configuration of the image generation apparatus 200. A CPU 201 executes various processes by using computer programs and data stored in a memory such as a RAM 202 or a ROM 203. By this, the CPU 201 performs operation control of the whole image generation apparatus 200 and also executes and controls various processes described later that the image generation apparatus 200 performs. Note, the CPU 201 may be a single processor and may also be a plurality of processors.

The RAM 202 has an area for storing computer programs and data loaded from a memory such as the ROM 203 or a storage unit 204. Furthermore, the RAM 202 has a work area used when the CPU 201 executes various processes. In this way, the RAM 202 can provide various areas. The ROM 203 stores data and programs such as setting data and a boot program that do not need to be rewritten.

The storage unit 204 is a storage apparatus that stores programs and data, and is a large capacity information storage apparatus such as a hard disk drive apparatus, for example. The storage unit 204 can save an OS (operating system) and computer programs and data for causing the CPU 201 to execute various processes described later as those performed by the image generation apparatus 200, for example. The storage unit 204 can store image or video data targeted for processing. Programs and data saved in the storage unit 204 can be the target of processing by the CPU 201 after being loaded to the RAM 202 according to control by the CPU 201. The storage unit 204, besides being a hard disk drive apparatus, may also be a device that reads information from a storage medium such as a CD-ROM or a DVD-ROM and may also be a memory apparatus such as a flash memory or a USB memory.

An output interface 205 can cause a display apparatus 207 connected to the output interface 205 to perform a display by sending display data to the display apparatus 207. In this way, the display apparatus 207 can display or project images or text by using a processing result by the CPU 201. The display apparatus 207 may be a CRT, a liquid crystal screen, or a projection apparatus, for example.

The CPU 201, the RAM 202, the ROM 203, the storage unit 204, the output interface 205 are all connected to a bus 206 and can mutually communicate via the bus 206. Note, the configuration illustrated in FIG. 2 is merely one example of a configuration of a computer apparatus that can be applied to the image generation apparatus 200. For example, the image generation apparatus 200 may have hardware such a GPU (Graphics Processing Unit), an ASIC, or an FPGA in place of the CPU 201 or in addition to the CPU 201. In such a case, hardware such as a GPU, an ASIC, or an FPGA may perform some of or all processing that the CPU 201 normally performs.

(Method of Setting a Spatial Resolution)

Figure 5:
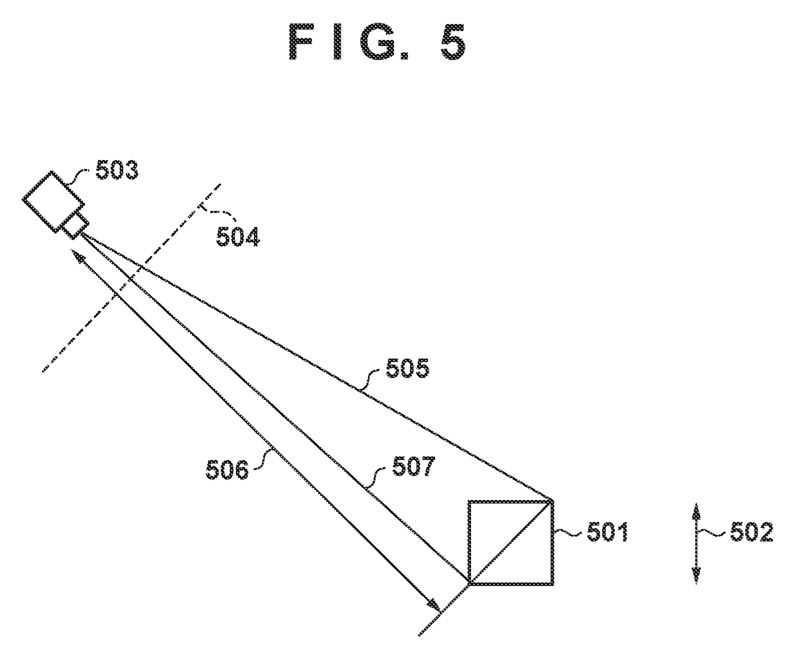
FIG. 5 is a conceptual diagram for describing a spatial resolution calculation method.

Description referencing FIG. 5 is given regarding a method of setting a spatial resolution according to the present embodiment. FIG. 5 illustrates a positional relationship between a voxel 501 set within a three-dimensional space and a virtual camera 503 arranged at a virtual viewpoint. A virtual viewpoint image acquired in the present embodiment corresponds to an image acquired by the virtual camera 503 arranged at a virtual viewpoint.

In the following description, the three-dimensional space in which the object exists is discretely represented by using voxels. In other words, a targeted three-dimensional space is divided by voxels which are a regular lattice of a size Δ [mm]. The coordinates of each voxel can be expressed by using a lattice vector such as (x-coordinate, y-coordinate, z-coordinate)=(0, 0, 0), (1, 0, 0), (3, 0, 1) . . . . An actual physical position within the three-dimensional space corresponding to a voxel is acquired by multiplying the size Δ of the regular lattice with such a lattice vector. It is possible to use a value such as 5 mm as Δ for example.

FIG. 5 shows a state in which the voxel 501 is projected to the virtual camera 503. A line 506 represents a distance z [mm] from the central portion of the voxel 501 to the virtual camera 503 in an optical axis direction of the virtual camera 503. Also, lines 505 and 507 are lines from which the end portion of the voxel 501 is projected to the virtual camera 503. A line 502 represents the voxel size Δ [mm]. A plane 504 represents a projection plane of the virtual viewpoint image acquired by the virtual camera 503. Hereinafter, f [pix] is a focal length of the virtual camera 503 expressed in pixel units.

When the voxel 501 is projected to the virtual camera 503, the voxel 501 when seen from the virtual camera 503 appears largest in the case where the longest diagonal (whose length is √3Δ) of the voxel 501 is orthogonal to the optical axis of the virtual camera 503. At that time, the size of the voxel 501 on the virtual viewpoint image is represented by a pixel width d [pix] according to the following formula.

$$d=\sqrt{3}(f\Delta/z) \quad \text{Equation (1)}$$

In other words, in a case where the voxel size is Δ, the resolution of an object on the virtual viewpoint image does not become finer than d [pix]. Here, in consideration of a case in which the resolution of the object is lowest, the pixel width d is calculated by using the longest diagonal line of the voxel (whose length is $\sqrt{3}\Delta$). However, instead, the pixel width d can also be calculated by using the diagonal line (whose length is $\sqrt{2}\Delta$) of a square of the voxel or one side (whose length is $\Delta$) of the voxel.

Meanwhile, in accordance with Equation (1), in a case where it is desired that the object on the virtual viewpoint image be expressed by a resolution finer than the acceptable resolution w [pix], it is necessary that $$\sqrt{3}(f\Delta/z)<w \quad\quad\quad \text{Equation (2)}$$

holds. For example, it is necessary that $\sqrt{3}$ (f$\Delta$/z)<2 holds in a case where it is desired that the object be expressed by a resolution finer than 2 [pix]. By solving the equation for $\Delta$, it is possible to acquire the voxel size $\Delta$ necessary for acquiring the acceptable resolution w, in other words a necessary spatial resolution. In this way, by using the distance z to a specific object and the acceptable resolution w for the specific object in the virtual viewpoint image, it is possible to acquire the spatial resolution $\Delta$ necessary for expressing the specific object more finely than the acceptable resolution w. Also, it is possible acquire the spatial resolution $\Delta$ by using a distance z to a specific target point not limited to an object.

Thus determined spatial resolution $\Delta$ can be set as the resolution of the object shape data. In such a case, when an object having a shape represented by object shape data and positioned at the reference point is projected on the virtual viewpoint image, it is possible to increase (make finer) the resolution of the shape of the object on the virtual viewpoint image such that it is set to be the value designated as the resolution or greater (w or greater). In this example, the acceptable resolution w can be said to be a resolution designated as a resolution of the shape of the object in the virtual viewpoint image.

Also, there are cases where it is desired that all objects be expressed by a resolution finer than w [pix] on the virtual viewpoint image. Since, $\sqrt{3}$(f$\Delta$/z) becomes larger as the object gets closer to the virtual camera 503, if Equation (2) holds for the object closest to the virtual camera 503, Equation (2) holds for all objects. Accordingly, when the distance of the object closest to the virtual camera 503 is $z_{min}$, in order to express all objects on the virtual viewpoint image by a resolution finer than w [pix], it is necessary that $$\sqrt{3}(f\Delta/z_{min})<w \quad\quad\quad \text{Equation (3)}$$

holds.

In this way, it is possible to acquire the spatial resolution $\Delta$ necessary for expressing all objects finer than the acceptable resolution w by using a distance $z_{min}$ to the object whose distance is closest to the virtual viewpoint and the acceptable resolution w in the virtual viewpoint image. In other words, a distance between a reference point and a virtual viewpoint may be a distance between the object closest to the virtual viewpoint among a plurality of objects and the virtual viewpoint. However, limitation is not made to this, and a distance between a reference point and a virtual viewpoint may be a distance between the object closest to a target point among a plurality of objects and the virtual viewpoint, for example.

Also, since the calculation cost and the necessary memory capacity are reduced, it is possible to employ the largest value among the spatial resolutions $\Delta$ at which Equation (2) or Equation (3) holds as the spatial resolution of the three-dimensional model. For example, it is possible to determine the spatial resolution $\Delta$ in accordance with $\Delta=wz/f\sqrt{3}$ or $\Delta=wz_{min}/f\sqrt{3}$.

Furthermore, it is also possible to change the resolution $\Delta$ of the three-dimensional model for each object. In such a case, when the representative distance to an object i is $z_i$, the resolution of the three-dimensional model of the object i is $\Delta_i$, and the acceptable resolution is w [pix], Equation (4) can be acquired by using Equation (1).

$$\Delta_i=wz_i/f\sqrt{3} \quad\quad\quad \text{Equation (4)}$$

By using Equation (4), it is possible to calculate an optimum resolution for each object. In such a case, the size $\Delta$ of the voxel that is a configuration element which configures the three-dimensional model of the object becomes larger for the objects farther from the virtual camera 503 than for objects closer to the virtual camera 503. In this way, it is possible to independently set the resolution of the object shape data for each object in accordance with the distance between each of the plurality of objects and the virtual viewpoint. Note, the parameter relating to the resolution of the object that the image generation apparatus 200 sets is not limited to the voxel size $\Delta$, and may be another parameter such as the number of voxels configuring the object shape data or the size of a mesh configuring the three-dimensional model.

Note, the focal length f can be represented in units of [mm]. When the resolution of a physical object on the projection plane in the virtual viewpoint image is r [pix/mm], the focal length f [pix] represented in pixel units can be expressed by $$f[\text{pix}]=r[\text{pix/mm}]\times f[\text{mm}] \quad\quad\quad \text{Equation (5)}$$

Processing of the Present Embodiment

Figure 3:
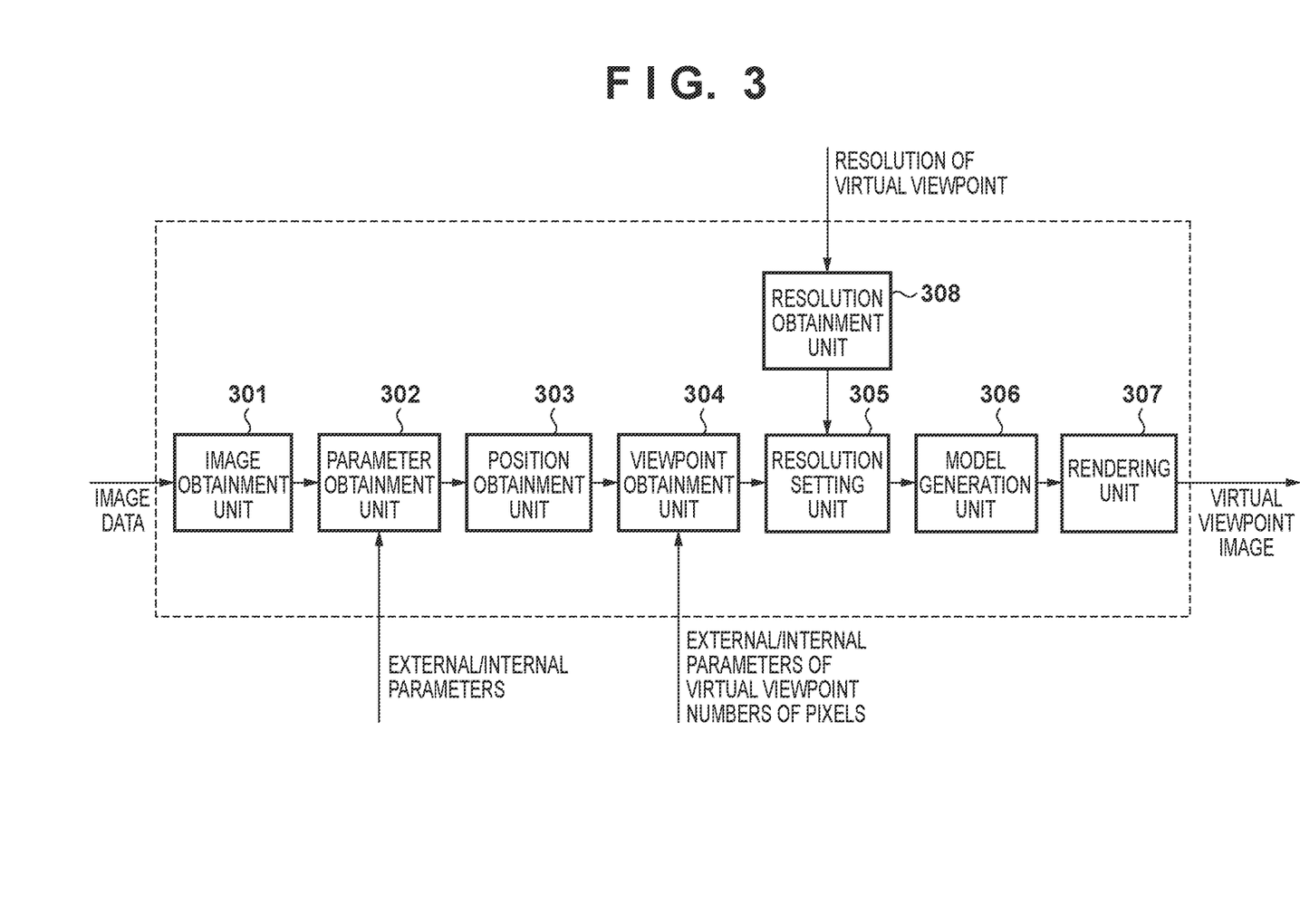
FIG. 3 is a block diagram illustrating a configuration of the image generation apparatus according to the embodiment.
Figure 4:
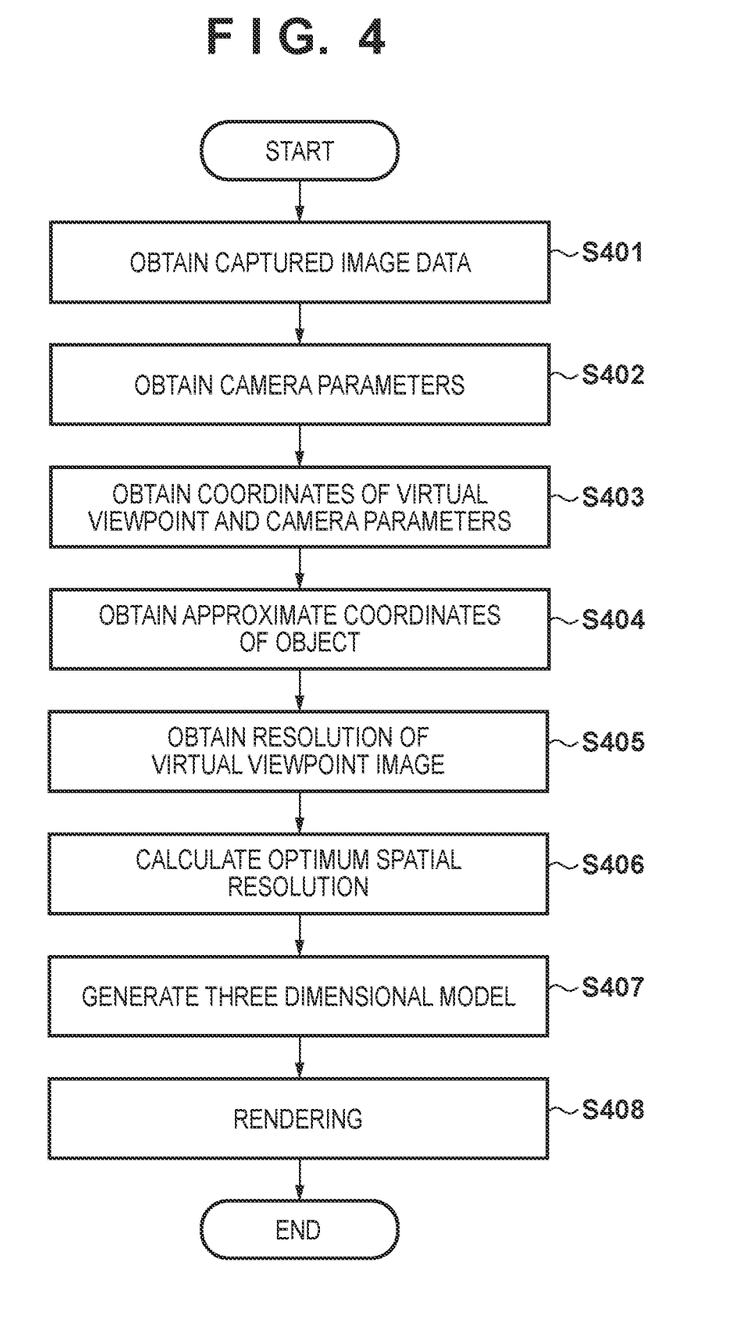
FIG. 4 is a flowchart illustrating a flow of processing of an image generation method according to the embodiment.

Hereinafter, description is given using a functional block diagram illustrated in FIG. 3 and a flowchart illustrated in FIG. 4 regarding processing performed by the image generation apparatus 200 of the first embodiment. The image generation apparatus 200 of the first embodiment is equipped with an image obtainment unit 301, a parameter obtainment unit 302, a position obtainment unit 303, a viewpoint obtainment unit 304, a resolution setting unit 305, a model generation unit 306, a rendering unit 307, and a resolution obtainment unit 308 as illustrated in FIG. 3. The image generation apparatus 200 can realize functions of each foregoing unit by the CPU 201 reading and executing a control program stored within the ROM 203. Note, the image generation apparatus 200 may be equipped with a dedicated processing circuit corresponding to one or more configuration units illustrated in FIG. 3. Hereinafter, the flow of the processing performed by each configuration unit according to the present embodiment is described.

In step S401, the image obtainment unit 301 obtains an object image group captured from a plurality of differing positions. For example, the image obtainment unit 301 can obtain from the storage unit 204 image data acquired from a plurality of viewpoints (in other words, image data captured by the plurality of the cameras 101). The image obtainment unit 301 may obtain images directly from the cameras 101. The image obtainment unit 301 can obtain a still image group acquired approximately at the same time by the plurality of the cameras 101. Also, the image obtainment unit 301 can obtain a video group captured from a plurality of differing positions. For example, the image obtainment unit 301 can obtain a group of frame images acquired at approximately the same time from among video acquired by the plurality of the cameras 101.

In step S402, the parameter obtainment unit 302 obtains camera parameters of the cameras 101. The camera parameters include internal parameters, external parameters, and distortion parameters. The internal parameters may include the coordinate values of the center of an image and the focal length of the camera lens. The external parameters are parameters representing the position and direction of the camera. Although a position vector and rotation matrix of a camera in global coordinates are used as the external parameters in the present specification, the external parameter may describe the position and direction of a camera by another method. The distortion parameters represent a distortion of the camera lens. From such camera parameters, it is possible to acquire the position of a camera capturing an image and the direction from the camera toward an object corresponding to each pixel of the image. The method of obtaining the camera parameters is not particularly limited. For example, the camera parameters may be stored in advance in the storage unit 204. The camera parameters can be acquired by performing an estimation by using a structure from motion method, for example, based on image data from the plurality of viewpoints, and can be acquired by performing a calibration in which a chart or the like is used.

In step S403, the viewpoint obtainment unit 304 obtains position information of the virtual viewpoint. For example, the viewpoint obtainment unit 304 can obtain the camera parameters of the virtual viewpoint. A virtual viewpoint image acquired in the present embodiment corresponds to an image acquired by a virtual camera arranged at a virtual viewpoint in accordance with the camera parameters. From the camera parameters of the virtual viewpoint, it is possible to acquire the position of the virtual viewpoint and the direction from the virtual viewpoint toward an object corresponding to each pixel of the virtual viewpoint image. The position and direction (line of sight direction) of the virtual viewpoint, the focal length, the number of pixels (resolution) of the virtual viewpoint image, and the like are given as concrete examples of such camera parameters.

In step S404, the position obtainment unit 303 obtains the distance between the virtual viewpoint and the reference point that is a reference for the resolution setting. A point indicating the object that is a reference of the resolution setting as previously described and a target point that is a reference for the resolution setting are encompassed in the reference point. In other words, the position obtainment unit 303 can obtain the distance from the virtual viewpoint to the object or to the decided target point. Here, the position obtainment unit 303 can obtain position information of the object as the position information of the reference point and can obtain the distance between the reference point and the virtual viewpoint based on this position information.

The distance obtained in step S404 may be an approximate distance. Also, it is not necessary for the position obtainment unit 303 to obtain a distance from the virtual viewpoint for a plurality of portions of one object (a player, for example) and it may obtain a single distance for a single object. Additionally, configuration may be such that in a case where there are a plurality of objects (a plurality of players for example), the position obtainment unit 303 obtains the distance from the virtual viewpoint for only one object (the object closest to the virtual viewpoint, for example) among the plurality of objects. Meanwhile, the position obtainment unit 303 may obtain the distance from the virtual viewpoint for each of the plurality of objects.

The position obtainment unit 303 can estimate the approximate position information of an object by using an object image group for example. Also, the position obtainment unit 303 can obtain the approximate position information of an object as the position information of a reference point. In this way, the position obtainment unit 303 can obtain a distance between a reference point and a virtual viewpoint. Performing a visual volume intersection method by using voxels of a coarse resolution is given as a specific example of how to do this. Also, it is possible to perform object recognition and perform a distance estimation in which a stereo matching method is used for a portion of a recognized object. It is also possible to use another known method for obtaining a rough distance to an object. Also, the position obtainment unit 303 can obtain information which specifies a target point and calculate the distance from a virtual viewpoint to the target point. Here, the target point is a point that becomes the main target to be focused on in the virtual viewpoint image. Also, in a case where a plurality of the cameras 101 are installed so as to direct their optical axes to a common position, the target point may be this position. In other words, the target point may also be a position that the plurality of the cameras 101 are directed towards.

In step S405, the resolution obtainment unit 308 obtains a resolution designated as the resolution of a location corresponding to the reference point within the virtual viewpoint image. The virtual viewpoint image is generated such that the resolution of the shape of an object at a location corresponding to the reference point becomes greater than or equal to a predetermined resolution. For example, the resolution obtainment unit 308 can obtain an acceptable resolution for the virtual viewpoint as described above. The method in which the resolution obtainment unit 308 obtains the acceptable resolution is not particularly limited. For example, the resolution obtainment unit 308 can obtain the predefined acceptable resolution from a storage medium such as the storage unit 204. Also, the resolution obtainment unit 308 can obtain the acceptable resolution from an external unit. Meanwhile, the acceptable resolution may be a fixed value. Description regarding one example of a setting method of the acceptable resolution is given later.

In step S406, the resolution setting unit 305 sets the resolution of the object shape data in accordance with the distance between a virtual viewpoint and a reference point that is the reference for the resolution setting. Also, the resolution setting unit 305 can set the resolution of the object shape data in accordance with the resolution designated as a resolution of a location corresponding to the reference point within the virtual viewpoint image. Also, as described above, it is possible to set the resolution of the object shape data in accordance with the resolution and the angle of view (the focal length, for example) of the virtual viewpoint image. For example, the resolution setting unit 305 can calculate a spatial resolution at a time of generating a three-dimensional model of an object as described above in accordance with the acceptable resolution obtained in step S405.

In step S407, the model generation unit 306 generates object shape data of the object according to the resolution set by the resolution setting unit 305 by using the image group of the object. For example, the model generation unit 306 can generate a three-dimensional model of the object in accordance with the spatial resolution calculated in step S406. A known method such as a visual volume intersection method or a stereo matching method can be used as the method for generating the three-dimensional model of the object. Such a method is described in known documents such as Japanese Patent Laid-Open No. 2000-215311, and so a detailed description thereof is omitted. However, the method for acquiring the object shape data is not limited to this method and object shape data having various resolutions, for example, may be prepared in advance.

In a case where the model generation unit 306 generates a three-dimensional model represented by voxels, it is possible generate a three-dimensional model having the resolution set by the resolution setting unit 305. In such a case, the object shape data is voxel data and the resolution can represent the size of the voxels. Also, the model generation unit 306 can generate a depth map or a parallax map of an object seen from the virtual viewpoint as a three-dimensional model. In such a case, the resolution setting unit 305 can calculate the step width of a depth value by a similar method to the method for setting the size of voxels of the three-dimensional model. In other words, the object shape data may be depth map data or parallax map data, and the resolution can indicate the step width of the depth direction here.

Note, the setting method of the spatial resolution by the resolution setting unit 305 can be appropriately changed in accordance with the type of the three-dimensional model that the model generation unit 306 generated. For example, the spatial resolution can be set in accordance with the acceptable resolution of the virtual viewpoint image and the distance from the virtual viewpoint to the object. Specifically, it is possible to set the spatial resolution such that the three-dimensional model is finer for a smaller acceptable resolution of the virtual viewpoint image in comparison to a larger acceptable resolution. Also, it is possible to set the spatial resolution such that the three-dimensional model is finer for a shorter distance from the virtual viewpoint to the object in comparison to for a longer distance. As one example, in a case where the acceptable resolution of the virtual viewpoint image is fixed, it is possible to calculate the spatial resolution based on another equation instead of calculating the spatial resolution based on Equation (1), such that the spatial resolution becomes lower the longer the distance from the virtual viewpoint to the object becomes. Also, it is possible to prepare in advance a table representing the relationship between the spatial resolution and the distance from the virtual viewpoint to the object and set the spatial resolution based on this table. Also, it is possible for the resolution setting unit 305 to set the spatial resolution such that the three-dimensional model is finer for a narrower angle of view of the virtual viewpoint image in comparison to a wider angle of view. Furthermore, it is possible for the resolution setting unit 305 to set the spatial resolution such that the three-dimensional model is finer for a larger number of pixels of the virtual viewpoint image in comparison to a smaller number of pixels.

In step S408, the rendering unit 307 generates the virtual viewpoint image of the object from the virtual viewpoint by using the object shape data according to the resolution and the image group of the object. For example, the rendering unit 307 can generate the virtual viewpoint image from the virtual viewpoint based on the three-dimensional model generated in step S407. It is possible to use a known method as the method for generating the virtual viewpoint image. Such a method is described in known documents such as Japanese Patent Laid-Open No. 2000-215311, and so a detailed description thereof is omitted. To give a simple example, the rendering unit 307 can specify the position of the object corresponding to a pixel of interest of the virtual viewpoint image from the virtual viewpoint based on the three-dimensional model and the camera parameters acquired in step S404. Next, by referencing the camera parameters acquired in step S402, the rendering unit 307 can specify a pixel corresponding to a position of the object in the captured image of the cameras 101. Then, the rendering unit 307 can determine color information of the pixel of interest by using color information of the pixel specified in this way. By performing such processing for each pixel, it is possible to generate the virtual viewpoint image.

As described above, the resolution setting unit 305 can set the distance between the object and the virtual viewpoint, the resolution specified as the resolution of the shape of the object for the virtual viewpoint image, and the resolution of the object shape data. Accordingly, regardless of the distance between the object and the virtual viewpoint, the rendering unit 307 can generate the virtual viewpoint image so that the resolution of the shape of the object in the virtual viewpoint image becomes greater than or equal to the predetermined resolution. The foregoing is a flow of the processing of the image generation apparatus 200. Note, the image generation apparatus 200 may generate a virtual viewpoint image that includes an image of an object of a resolution according to the set parameters, and this generation method is not limited to the above. For example, in place of causing the resolution set by the resolution setting unit 305 to be reflected at a time of a generation of the object shape data, the object shape data may be generated at a predefined resolution, and the resolution set by the resolution setting unit 305 may be caused to be reflected at a time of rendering.

(Example of a Method for Setting an Acceptable Resolution)

As one example, hereinafter, description is given regarding a case where a user inputs the acceptable resolution by using a UI and the resolution obtainment unit 308 obtains the inputted the acceptable resolution. In such a case, the resolution obtainment unit 308 can cause the display apparatus to display the user interface for the user to designate the resolution of a location corresponding to the reference point within the virtual viewpoint image.

Figure 6:
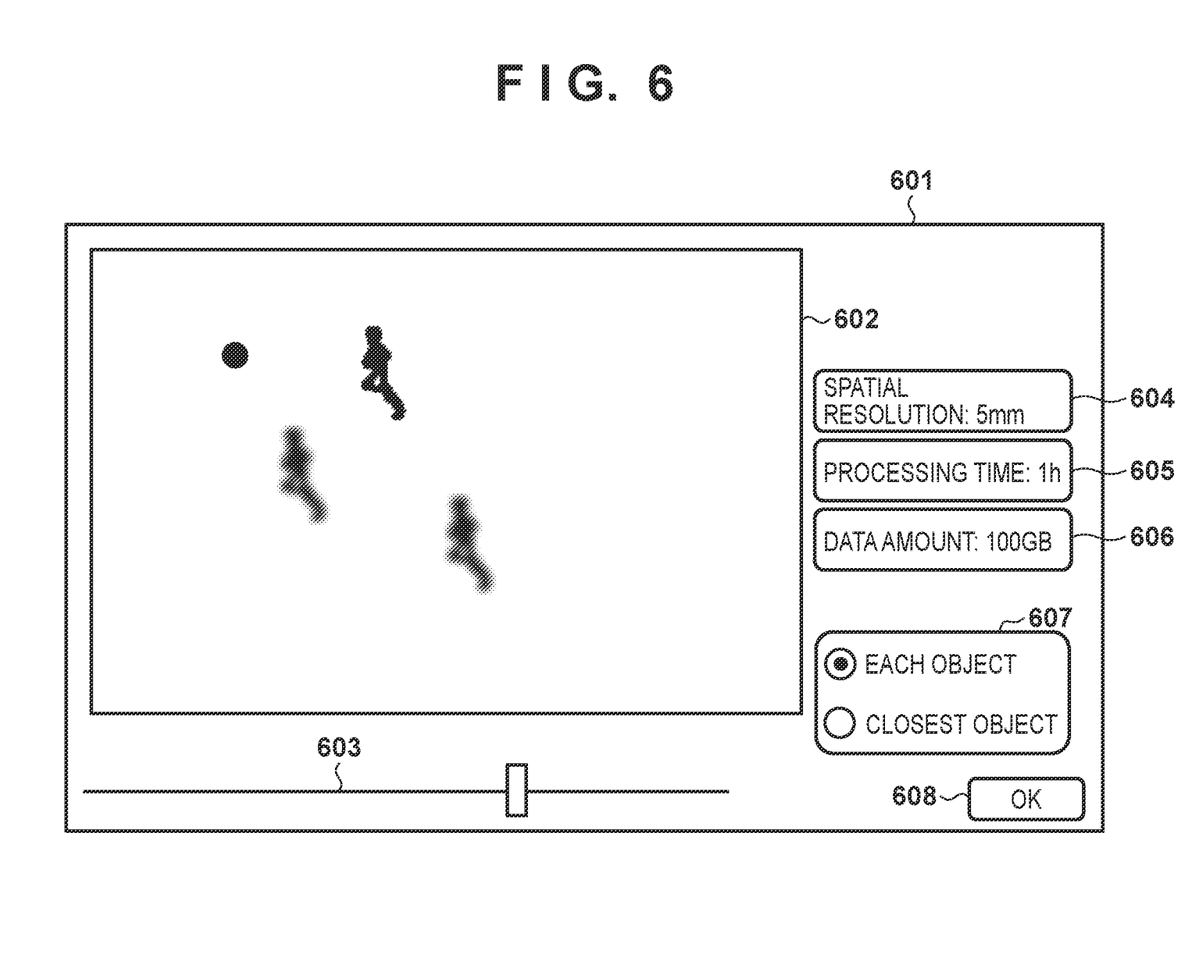
FIG. 6 is a view illustrating one example of a user interface used for setting of a resolution.

FIG. 6 illustrates one example of a UI that can be used to set a spatial resolution. A window 601 illustrated in FIG. 6 represents a display screen displayed on the display apparatus 207. The window 601 includes a window 602, a slide bar 603, windows 604 to 606, a window 607, and an OK button 608. The resolution obtainment unit 308 can cause the display apparatus 207 to display the window 601 and obtain the acceptable resolution that a user inputted on the window 601.

An image is displayed on the window 602. For example, a pseudo-virtual viewpoint image can be displayed on the window 602. Although the image displayed on the window 602 may be the actual rendered virtual viewpoint image, it may be another image. For example, it is possible to display an image captured by any of the cameras 101 on the window 602. In such a case, it is possible to display to the window 602 an image captured by a camera whose direction is closest to the virtual viewpoint or a camera whose position is closest to the virtual viewpoint. Also, the resolution obtainment unit 308 can display to the window 602 an image captured by a camera 101 after magnification or reduction in accordance with the angle of view of the virtual viewpoint. It is not necessary to display the whole image on the window 602. In other words, configuration may be such that the resolution obtainment unit 308 displays only a region for which the influence of the spatial resolution on the image quality is largest, such as an image of the object closest to the virtual viewpoint.

The slide bar 603 is used in order to control the acceptable resolution of the virtual viewpoint image. In other words, the user can specify the acceptable resolution by adjusting the position of the slide bar 603, and thus the resolution obtainment unit 308 can obtain the acceptable resolution that is specified. Also, the resolution obtainment unit 308 can display on the window 602 a blurred image in accordance with the selected acceptable resolution. For example, the resolution obtainment unit 308 can obtain the acceptable resolution w [pix] corresponding to the position of the slide bar 603 and display on the window 602 an image to which blur of a diameter w is applied. A method for applying a low-pass filter such as a gaussian filter or an average value filter for example is given as the method for applying a blur. In this way, the image is displayed on the user interface and the resolution of the image is changed in accordance with the resolution that the user specified.

For the windows 604 to 606, various information relating to virtual viewpoint image generation processing is displayed. For example, the spatial resolution that the resolution setting unit 305 calculated by the foregoing method in accordance with the acceptable resolution currently selected is displayed on the window 604 with a numerical value. Also, in a case where the spatial resolution displayed on the window 604 is used, a required time estimated as necessary for generating a virtual viewpoint image or a virtual viewpoint video is displayed on the window 605. Furthermore, the data amount of the three-dimensional model estimated in a case where the spatial resolution displayed on the window 604 is used is displayed on the window 606.

A selection item indicating a method of setting the spatial resolution is displayed on the window 607. Specifically, "each object" and "closest object" are displayed as setting modes on the window 602. "Each object" indicates a mode in which the spatial resolution is changed for each object and "closest object" indicates a mode in which the spatial resolution is decided based on only the object closest to the virtual viewpoint. The user can select their preferred mode by using a radio button. In a case where the spatial resolution is changed for each object, the spatial resolution is displayed on the window 604 for a representative object, for example the object closest to the virtual viewpoint. Although not illustrated in FIG. 6, in a case where the spatial resolution is set in accordance with the distance to a particular target point, it is possible to use a user interface by which a target point (a point on the ground for example) can be specified by clicking on the window 602 for example.

The user can adjust the acceptable resolution by using the slide bar 603 while viewing the quality of the image displayed on the window 602 and the numerical values displayed on the windows 604 to 606. Also, in a case where the user presses the OK button 608, the spatial resolution (the window 604) that the resolution setting unit 305 calculated in accordance with the acceptable resolution according to the slide bar 603 is set as the spatial resolution used for the generation of the virtual viewpoint image.

By virtue of the present embodiment which employs the above processing, it is possible to reduce a calculation amount or the memory capacity that is used, while maintaining an acceptable quality when generating a virtual viewpoint image based on a three-dimensional model. In other words, the processing load can be reduced as a result.

Second Embodiment

In the second embodiment, description is given regarding a configuration for suppressing a fluctuation in the resolution between frames when generating a virtual viewpoint video from video captured from multiple viewpoints. Here, the virtual viewpoint video is configured by a plurality of frames and each frame corresponds to a virtual viewpoint image. Also, each virtual viewpoint image is generated by using frames configuring the video acquired by each of the cameras 101 at approximately the same time.

When the spatial resolution of the three-dimensional model is constant regardless of the frame, there is a possibility that a degradation of the resolution of the virtual viewpoint image will occur in accordance with the position of the virtual viewpoint as previously described. In other words, a fluctuation of the resolution occurs temporally. In the present embodiment, a fluctuation of the resolution between frames is suppressed by appropriately calculating the spatial resolution so that the acceptable resolution of the virtual viewpoint image of each frame of each frame image becomes fixed, by using a similar method to the first embodiment.

Description of the basic configuration of the image generation apparatus according to the present embodiment is omitted because it is the same as in the first embodiment. Hereinafter, description is given regarding processing of the second embodiment referencing the flowchart of FIG. 7.

Figure 7:
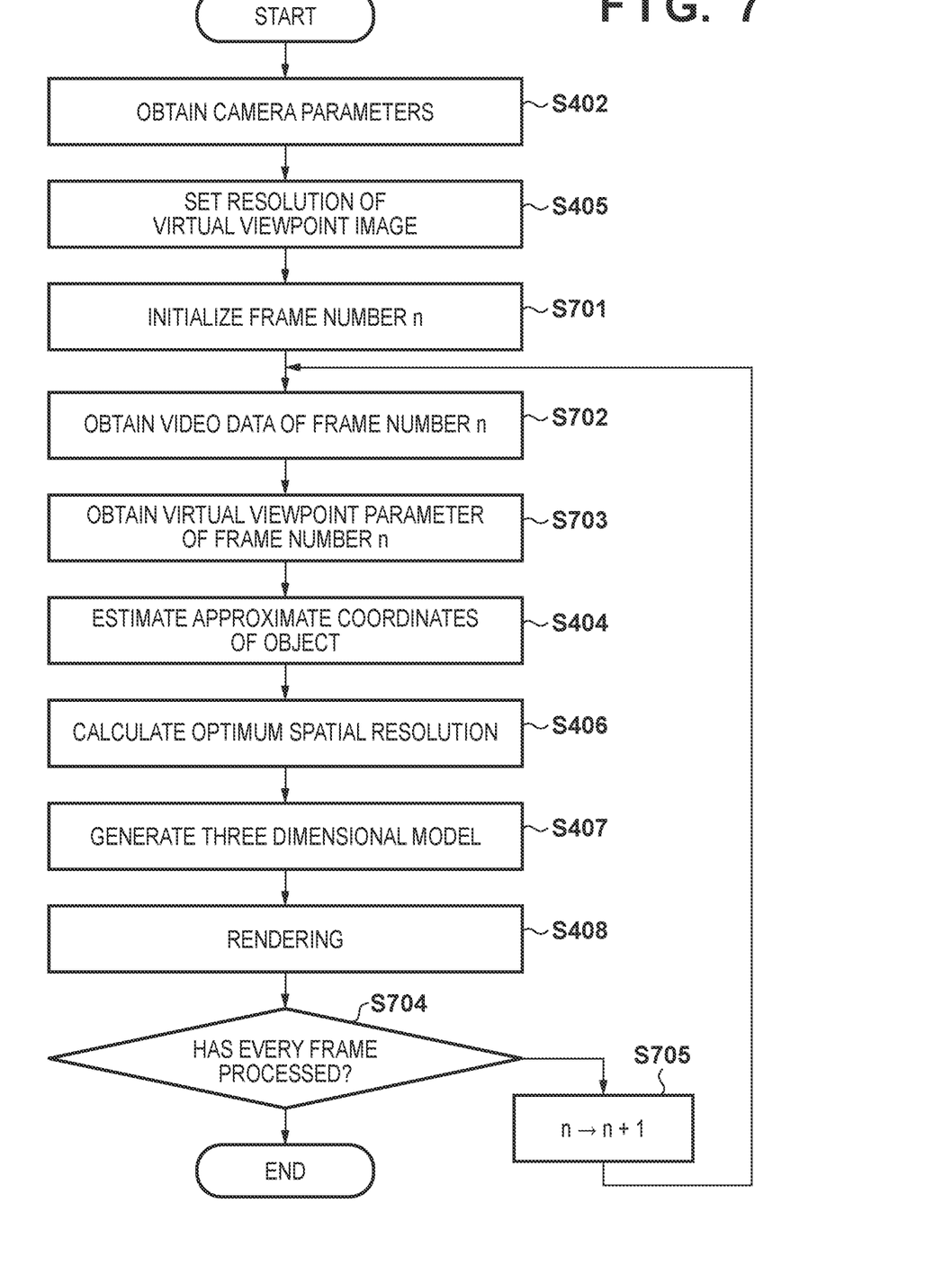
FIG. 7 is a flowchart illustrating a flow of processing of an image generation method according to the embodiment.

Step S402 and step S405 are performed similarly to in the first embodiment. In step S701, the image obtainment unit 301 initializes a frame number n and sets the value of n as the initial frame number. Next, in step S702, the image obtainment unit 301 obtains multi-viewpoint image data of the frame number n. Specifically, the image obtainment unit 301 obtains a group of images of the frame number n which are acquired at approximately the same time from the moving image data that the cameras 101 respectively obtained.

In step S703, the viewpoint obtainment unit 304 obtains position information of the virtual viewpoint for each frame. For example, the viewpoint obtainment unit 304 can obtain parameters of the virtual viewpoint for the frame number n. Virtual viewpoint parameters are as described in the first embodiment. Step S404 is performed similarly to in the first embodiment. In step S406, the resolution setting unit 305 sets a resolution of the object shape data for the frame number n by a similar method to that of the first embodiment. Specifically, the resolution setting unit 305 sets the resolution of the object shape data in accordance with the distance between a virtual viewpoint and a reference point for each frame. Step S407 is performed similarly to in the first embodiment. In step S408, the rendering unit 307 generates a virtual viewpoint image for the frame number n by a similar method to that of the first embodiment. In other words, the rendering unit 307 generates the virtual viewpoint image of the object from the virtual viewpoint by using the video group and the object shape data according to the resolution for each frame. By such processing, the rendering unit 307 generates the virtual viewpoint video.

The rendering unit 307 in step S704 determines whether all frames have been processed. In a case where there remain frames to be processed, the image obtainment unit 301 updates the frame number from n to n+1 in step S705. In a case where the processing of all frames is determined to have completed in step S704, the processing ends.

Note, although the resolution of the object shape data for each frame is set in the foregoing processing described using FIG. 7, limitation is not made to this. For example, the image generation apparatus 200 may calculate a distance between the virtual viewpoint and the object for each frame and set the resolution of the object shape data for every frame in accordance with said distance for frames in which the object and the virtual viewpoint are nearest. In other words, the resolution of the object shape data in other frames may be set in accordance with the condition of the frame in which the resolution of the object in the virtual viewpoint image is the lowest from among the plurality of frames to be processed. Also, in a case where a plurality of virtual viewpoints corresponding to the same capture time are set and a plurality of virtual viewpoint images are generated, similarly the resolution of the object shape data may be set for each virtual viewpoint and based on a relationship between one virtual viewpoint and a reference point, the resolution of the object shape data relating to another virtual viewpoint may be set.

As described in the first embodiment, it is possible to set a spatial resolution in accordance with the distance from the virtual viewpoint to the object closest to the virtual viewpoint or a target point and in accordance with the acceptable resolution for the object or the target point. Also, in the second embodiment, the resolution setting unit 305 can set the resolution of the object shape data so that the resolution of a location corresponding to the reference point within the virtual viewpoint video is fixed for the respective frames, is within a predetermined range, or is greater than or equal to a predetermined resolution. In other words, it is possible to use a fixed value for respective frames or a value selected from within a predetermined range as the acceptable resolution. In such a case, it is possible to suppress a fluctuation of the resolution between frames for the object or for the vicinity of the target point. Also, as described in the first embodiment, it is possible to cause the spatial resolution to change for each object in accordance with the distance to the object and the acceptable resolution. In such a case, it is possible to suppress a fluctuation of the resolution between frames for each object.

Also, in the present embodiment, it is possible for a user to perform a setting of the acceptable resolution by using the UI illustrated in FIG. 6. In such a case, configuration may be such that only one representative frame from among a video or a virtual viewpoint video is displayed to the window 602. For example, it is possible to display to the window 602 a frame in which the object and the virtual camera 503 are nearest and to set the acceptable resolution based on this frame. By virtue of such method, it is possible to set the acceptable resolution under the harshest conditions. Also, it is possible to use a UI to perform an adjustment of the acceptable resolution by a slide bar in a state in which several frames are displayed simultaneously. In this way, it is possible to apply the set acceptable resolution to all frames. However, the acceptable resolution need not be strictly fixed for every frame and may slightly fluctuate for each frame.

By virtue of the present embodiment, it becomes possible to suppress a temporal fluctuation of a resolution in a virtual viewpoint video and generate a virtual viewpoint video that does not feel unnatural to a user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-155882, filed Aug. 10, 2017, which is hereby incorporated by reference herein in its entirety.

What is claimed is:

1. An image processing apparatus comprising:
one or more memories that store a set of instructions; and
one or more processors that execute the set of instructions to:
obtain images acquired based on image capturing for a target area from a plurality of directions by a plurality of image capturing devices;
obtain viewpoint information indicating a position of a virtual viewpoint;
determine, based on a positional relationship between a reference position within the target area and the position of the virtual viewpoint indicated by the obtained viewpoint information, a parameter indicating a size of a constituent element of a three-dimensional model which is data indicating a shape of an object within the target area;
generate a three-dimensional model based on the obtained images and the size of the constituent element according to the determined parameter; and
generate a virtual viewpoint image based on the generated three-dimensional model and the obtained viewpoint information.

2. The image processing apparatus according to claim 1, wherein the one or more processors execute the instructions to:
determine, based on the obtained viewpoint information, a distance between the reference position and the position of the virtual viewpoint indicated by the obtained viewpoint information,
wherein the parameter is determined, based on the determined distance.

3. The image processing apparatus according to claim 1, wherein the one or more processors execute the instructions to:
obtain device information indicating positions of the plurality of image capturing devices,
wherein the parameter is determined based on the positional relationship and the obtained device information.

4. The image processing apparatus according to claim 1, wherein the one or more processors execute the instructions to:

accept an instruction for controlling a resolution of a virtual viewpoint image,
wherein the parameter is determined based on the positional relationship and the accepted instruction.

5. The image processing apparatus according to claim 1, wherein
the reference position is a position of the object within the target area.

6. The image processing apparatus according to claim 1, wherein the parameter is determined for each of a plurality of objects, which are a plurality of the reference positions, based on a position of the object and the obtained viewpoint information.

7. The image processing apparatus according to claim 1, wherein the one or more processors execute the instructions to:
select one of a plurality of objects within the target area based on the obtained viewpoint information,
wherein the parameter is determined based on a positional relationship between a position of the selected object which is the reference position and the position of the virtual viewpoint indicated by the obtained viewpoint information.

8. The image processing apparatus according to claim 7, wherein the selected object is an object, from among the plurality of objects, closest to the virtual viewpoint indicated by the obtained viewpoint information.

9. The image processing apparatus according to claim 1, wherein the parameter for each frame image of a plurality of frame images of the virtual viewpoint image is determined, based on a positional relationship between a position of an object for the frame image, which is the reference position, and the position of the virtual viewpoint indicated by the obtained viewpoint information.

10. The image processing apparatus according to claim 1, wherein the reference position is a position that the plurality of image capturing devices are directed toward.

11. The image processing apparatus according to claim 1, wherein information indicating a direction from a virtual viewpoint is included in the viewpoint information.

12. The image processing apparatus according to claim 1, wherein the parameter is determined so that resolution parameters of the reference position for a plurality of frame images of a virtual viewpoint image are included within a predetermined range.

13. The image processing apparatus according to claim 1, wherein the parameter is determined so as to represent a specific object at the reference position using a specific number of pixels in the virtual viewpoint image.

14. A method comprising:
obtaining images acquired based on image capturing for a target area from a plurality of directions by a plurality of image capturing devices;
obtaining viewpoint information indicating a position of a virtual viewpoint;
determining, based on a positional relationship between a reference position within the target area and the position of the virtual viewpoint indicated by the obtained viewpoint information, a parameter indicating a size of a constituent element of a three-dimensional model which is data indicating a shape of an object within the target area;
generating a three-dimensional model based on the obtained images and the size of the constituent element according to the determined parameter; and
generating a virtual viewpoint image based on the generated three-dimensional model and the obtained viewpoint information.

15. A non-transitory computer-readable medium storing a computer program comprising instructions which, when the program is executed by a computer, cause the computer to perform:
obtaining images acquired based on image capturing for a target area from a plurality of directions by a plurality of image capturing devices;
obtaining viewpoint information indicating a position of a virtual viewpoint;
determining, based on a positional relationship between a reference position within the target area and the position of the virtual viewpoint indicated by the obtained viewpoint information, a parameter indicating a size of a constituent element of a three-dimensional model which is data indicating a shape of an object within the target area;
generating a three-dimensional model based on the obtained images and the size of the constituent element according to the determined parameter; and
generating a virtual viewpoint image based on the generated three-dimensional model and the obtained viewpoint information.

* * * * *